United States Patent Office 3,542,687
Patented Nov. 24, 1970

3,542,687
COMPOSITIONS AND PROCESSES FOR CLEANING BEARINGS
Harry C. Shannon and Charles L. Worboys, Rochester, N.Y., assignors to Eastman Kodak Company, Rochester, N.Y., a corporation of New Jersey
No Drawing. Filed Sept. 29, 1967, Ser. No. 671,596
Int. Cl. C09d 9/00; C11d 7/50; C23g 5/02
U.S. Cl. 252—170                     14 Claims

ABSTRACT OF THE DISCLOSURE

Aliphatic ketones containing 3 to about 13 carbon atoms (especially as part of flushing compositions containing, additionally, one or more organic diester-type high temperature lubricants) have the ability to "free" bearings that are caused to stick by the accumulation of a residue (of products of the decomposition of an organic diester-type high temperature lubricant) when the bearings are lubricated over a long period of time with certain high temperature lubricants.

---

The present invention relates to compositions having certain solvent properties with respect to viscous residues that accumulate on iron or steel bearings that have been lubricated with heat-resistant organic ester-type lubricants.

The high temperature lubricant art has progressed over the years to a point at which there are presently a large number of so-called heat-resistant lubricants that are commercially available. The particular heat-resistant lubricants with which the present invention is concerned are those having especially high performance ratings when they are exposed to mechanical stress at very high temperatures (for example, temperatures above about 300° F.). The class of lubricants to which this invention is directed includes all of those lubricants that are organic esters and which pass the well-known tests MIL–L–6085(2); MIL–L–6387A(1); MIL–O–11773(ORD); MIL–F–16929A.

Although these heat-resistant oragnic ester lubricants ordinarily perform very well, their use over prolonged periods of time in machinery having conventional iron or steel bearings and/or bearing boxes ultimately results in the development on the metal surfaces of a viscous residue having the undesired ability to bind the bearings in their races. This undesirable binding of the bearings is especially noticeable if the bearings have been used under high temperature conditions and then subsequently subjected to relatively lower temperatures. Such residues will sometimes be referred to herein as "cold-setting" residues. These cold-setting residues apparently result from some form of iron-catalyzed degradation of the organic ester lubricant (used in the presence of iron or steel), and can be identified not only by the cold-setting properties and from the infrared curves (which show their ester-type chemical nature), but also by the fact that by spectral analysis the residues contain a significant amount of alpha iron oxide (in spite of the fact that corrosion inhibitors are almost always present in the lubricant composition).

The development of such viscous residues on the surface of the bearings is particularly troublesome when the machinery in which the bearings are used must be run continuously for extended periods of time, where for example, the bearings cannot be removed from the machine and cleaned periodically. In practice, the build up of such undesired viscous residues in systems lubricated with organic ester-type heat-resistant lubricants can become so extreme as to eventually completely freeze the bearings. Some machines, for example, contain more than 1000 separate bearings, and are used continuously (without stopping) in production for as many as 18 months or more when no bearing freezing occurs. If even a single bearing freezes and the machine must be shut down to change bearings, the cost of shutdown can amount to many thousands of dollars. From this it can be appreciated that there was a definite need to find some way to prevent the periodic occurrence of such costly freezing of bearings.

It is an object of the present invention to provide methods and compositions whereby the difficulties set out above with respect to the development of viscous cold-setting residues on ferrous metal bearing surfaces to the point at which the bearings no longer more freely can be prevented. It is another object of this invention to provide methods and compositions whereby such problems relating to the stiffening and/or freezing of the action of bearing can be cured.

These objects as well as others that will become apparent from the following discussion and claims can be attained by contacting the coated bearing surface with a flushing composition containing an organic aliphatic ketone which has from 3 to 13 carbon atoms in its molecule. The invention is surprising in view of the fact that whereas a great many materials such as common aromatic solvents like benzene, xylene, and toluene as well as common alcoholic solvents like methanol, ethanol, butanol, and isopropanol have substantially no effect whatever on these undesired residues, practically all of the other conventional solvents such as the chlorinated hydrocarbons like methylene chloride, ethylene/dichloride, perchloroethylene, and chloroform, as well as the common hydrocarbon-type solvents such as Stoddard solvent, and even petroleum ether have the opposite effect (which is also undesirable) of causing the gummy or viscous residue to break away from the metal in the form of large chunks, the presence of which in the bearing boxes (dispersed through the lubricant system) are deterimental because they can become lodged back into the bearing areas and thereby cause the bearing to fail. Even flushing the residue-coated bearings with large quantities of lubricant composition, per se, won't remove the residue. Thus, the reason for the surprising success of this invention cannot be explained. Apparently the limited class of ketones set out above is the only class of materials that can provide the fairly critical balance of properties that is necessary to solve the problems set out above in an acceptable fashion. In the optimum practice of the present invention those ketones having the structure

wherein R and R' are alkyl groups containing from 1 to 5 carbon atoms, seem to function best. Typical examples of such preferred ketones are methyl ethyl ketone, and methyl isobutyl ketone. Of these, the use of methyl isobutyl ketone is still further preferred.

These effective ketones can be applied to the residue-coated bearings during the practice of the present invention in any convenient manner. They can be applied as a relatively pure ketone, per se, as a mixture of effective ketones, or in admixture with practically any other liquid material that is not ordinarily detrimental to the bearing surfaces. As a matter of fact, since one of the preferred processes of the present invention involves the application of a flushing composition directly to the surfaces of bearings and bearing boxes while the bearings remain in operation, a preferred flushing composition of this invention consists essentially of a blend of (1) one or more of the effective ketones with (2) one or more of the organic ester, high temperature lubricants. It can be appreciated that by the application of such a lubricant-ketone flushing composition directly to the surfaces of bearings in motion, the bearings will never be starved with respect to lubricant. Therefore, in such preferred lubricant-ketone flushing compositions of the present invention, the weight ratio of ketone to organic ester lubricant should be within the range of from about 1:9 to about 9:1, respectively, whereas particularly preferred flushing compositions are those in which the weight ratio of ketone to lubricant is about 1:1. Other materials can be present in these flushing compositions in relatively minor amounts without detracting completely from the benefits that can be obtained by practicing this invention. Corrosion inhibitors and dyes are typical examples of such other materials.

The heat-resistant organic ester lubricants that are preferred components in the flushing compositions of the present invention are the phthalate diesters having ester groups which contain from 6 to 18 carbon atoms per ester group. Still further preferred are those containing from 8 to 12 carbon atoms per ester group. Typical examples of such preferred phthalate diesters are dioctyl phthalate, didodecyl phthalate, diisodecyl phthalate, dihexadecyl phthalate, octyldecyl phthalate, and the like. Of these the use of diisodecyl phthalate is particularly preferred.

It should be noted that the problems relating to the development of the viscous cold-setting residues are caused by the use of organic ester, high temperature lubricant compositions that contain as their major component at least about 70 weight percent of the organic ester. Such high temperature lubricants are well known to those in the art and need not be described in great detail here. However, it is significant to note that such lubricant compositions can contain not only the organic ester but also a wide variety of additives such as corrosion inhibitors, antioxidants, dyes, and the like, such as those described in U.S. Patents 3,282,840 and 2,682,489.

EXAMPLE 1

After the use of a lubricating composition containing 98.9% of diisodecyl phthalate, 0.5% n-phenyl-alpha-napthylamine, 0.5% diphenylamine and 0.1% of a diester of succinic acid for a period of 12 months on a conventional steel ball-bearing unit which supports an idler roll in an atmosphere maintained almost continuously at a temperature of about 275° F., it is observed that the bearing has devloped a dark colored gummy coating. By spectral analysis it is determined that the dark material contains about 200 p.p.m. of alpha iron oxide and is composed of products resulting from the degradation of a phthalate ester. The amount of residue on the bearing and in the bearing race is enonugh to cause the bearing to freeze when its temperature is reduced to about 35° C.

While the bearing is still running (hot), small amounts of a flushing composition containing equal amounts of diisodecyl phthalate and methyl isobutyl ketone are applied with a paint brush to the outer surface of the bearing so that the flushing composition effectively bathes the bearing and its race over a period of about 5 minutes. During this 5-minute period, fresh amounts of the flushing composition are periodically applied to the bearing while excess lubricant material is collected on a clean cloth as it overflows from the bearing box. The stiff bearing is thereby washed completely free of the viscous cold-setting residue, the residue being removed gradually from the bearing so that no large chunks of residue fall free from the metal surface during the cleaning operation.

Since it is preferred that the ketone be removed from the immediate vicinity of the bearings within a relatively short time after the cleaning operation, the particular ketone that is selected for use as one of the major components of the flushing composition of this invention should have a relatively high vapor pressure at the temperature to which the bearing surfaces are exposed, particularly if the flushing composition is utilized as in Example 1, above, while the bearing is in operation. Thus, in Example 1 after about 12 hours subsequent to the time the flushing process is completed, analysis of the lubricant in the treated bearing box reveals that no more ketone remains in the lubricant system. The ketone has been evaporated into the hot atmosphere surrounding the bearing, leaving behind substantially pure lubricant once again, while the level of lubricant in the bearing box is maintained during this evaporation period by simply adding more of the desired lubricant composition as it is needed to fill the lubricant reservoir. After the flushing process the ketone can also be removed from the bearing box by simply bathing the bearing with a fairly large quantity of fresh lubricant to thereby wash substantially all of the flushing composition away from the bearing and the bearing box.

Stiff or frozen bearings can be cleaned in the foregoing manner while the bearings are running generally via the use of relatively small amounts of the flushing materials to prevent excessive splashing of the flushing material, or they can be cleaned with either one or more of the effective ketones, per se, or with one of the flushing compositions of this invention by simply immersing the bearing in the solvent system and scrubbing it, for example, with a clean brush. Other manipulative techniques for cleaning such bearings will be evident to those in the art from the foregoing discussion and it is to be understood that the practice of the present invention is not intended to be limited to those particular cleaning techniques set out above.

The invention has been described in detail with particular reference to preferred embodiments thereof, but it will be understood that variations and modifications can be effected within the spirit and scope of the invention as described hereinabove and as defined in the appended claims.

We claim:

1. A process for freeing stiff bearings having a coating thereon of a viscous cold-setting residue of degraded, heat-resistant organic diester lubricant, which process comprises bathing said stiff bearings with an aliphatic ketone having from 3 to about 13 carbon atoms.

2. A process as in claim 1, wherein said heat-resistant organic diester lubricant is a phthalate diester having ester groups containing from 6 to 18 carbon atoms each.

3. A process as in claim 2, wherein said ketone has the structure $$R'-\overset{O}{\underset{\|}{C}}-R$$

wherein R and R' are alkyl groups containing from 1 to 5 carbon atoms.

4. A process as in claim 3, wherein said ketone is selected from the group consisting of acetone, methyl ethyl ketone and methyl isobutyl ketone.

5. A process as in claim 3, wherein said ketone is applied to said stiff bearing in the form of a blend consisting essentially of (1) said ketone (2) said organic diester lubricant; the weight ratio of (1) and (2) respectively, in said blend being from about 1:9 to about 9:1.

6. A process as in claim 5, wherein said weight ratio is about 1:1.

7. In a process which comprises (a) lubricating steel bearings with a heat resistant organic diester lubricant and (b) turning the resulting lubricated bearings until a film of viscous cold-setting residue of degraded organic diester is deposited on said bearings to thereby form a stiff coated bearing; the improvement which comprises flushing said stiff, coated bearing with a flushing composition consisting essentially of a mixture of (1) a heat-resistant organic diester lubricant and (2) an aliphatic ketone containing from 3 to about 13 carbon atoms, the weight ratio of (1) to (2) in said mixture being from about 1:9 to about 9:1.

8. A flushing composition consisting essentially of a blend of (1) a ketone containing from 3 to about 13 carbon atoms and (2) a heat-resistant organic diester lubricant a phthalate diester wherein the ester groups contain from 6–18 carbon atoms each, in a ratio of 1:9 to 9:1 respectively.

9. A flushing composition as in claim 8, wherein said ketone has the structure

wherein R and R' are alkyl groups containing from 1 to 5 carbon atoms, and said organic diester lubricant is a phthalate diester having ester groups that contain from 6 to about 18 carbon atoms each.

10. A flushing composition as in claim 8, wherein each ester group in said phthalate diester contains from 8 to 12 carbon atoms.

11. A flushing composition as in claim 10, wherein said ketone is selected from the group consisting of acetone, methyl ethyl ketone and methyl isobutyl ketone.

12. A flushing composition as in claim 10, wherein the weight ratio of said ketone to said phthalate diester is about 1:1.

13. A flushing composition as in claim 11, wherein said phthalate diester is diisodecylphthalate.

14. A flushing composition as in claim 13, wherein said ketone is methyl isobutyl ketone.

References Cited

UNITED STATES PATENTS

| | | | |
|---|---|---|---|
| 2,199,187 | 4/1940 | Rosen | 252—57 |
| 2,215,590 | 9/1940 | Maverick | 252—57 |
| 2,264,964 | 12/1941 | Backoff et al | 252—170 |
| 2,316,754 | 4/1943 | Backoff et al. | 252—170 |

LEON D. ROSDOL, Primary Examiner

W. E. SCHULZ, Assistant Examiner

U.S. Cl. X.R.

106—311; 134—2, 34; 250—364